Patented June 23, 1925.

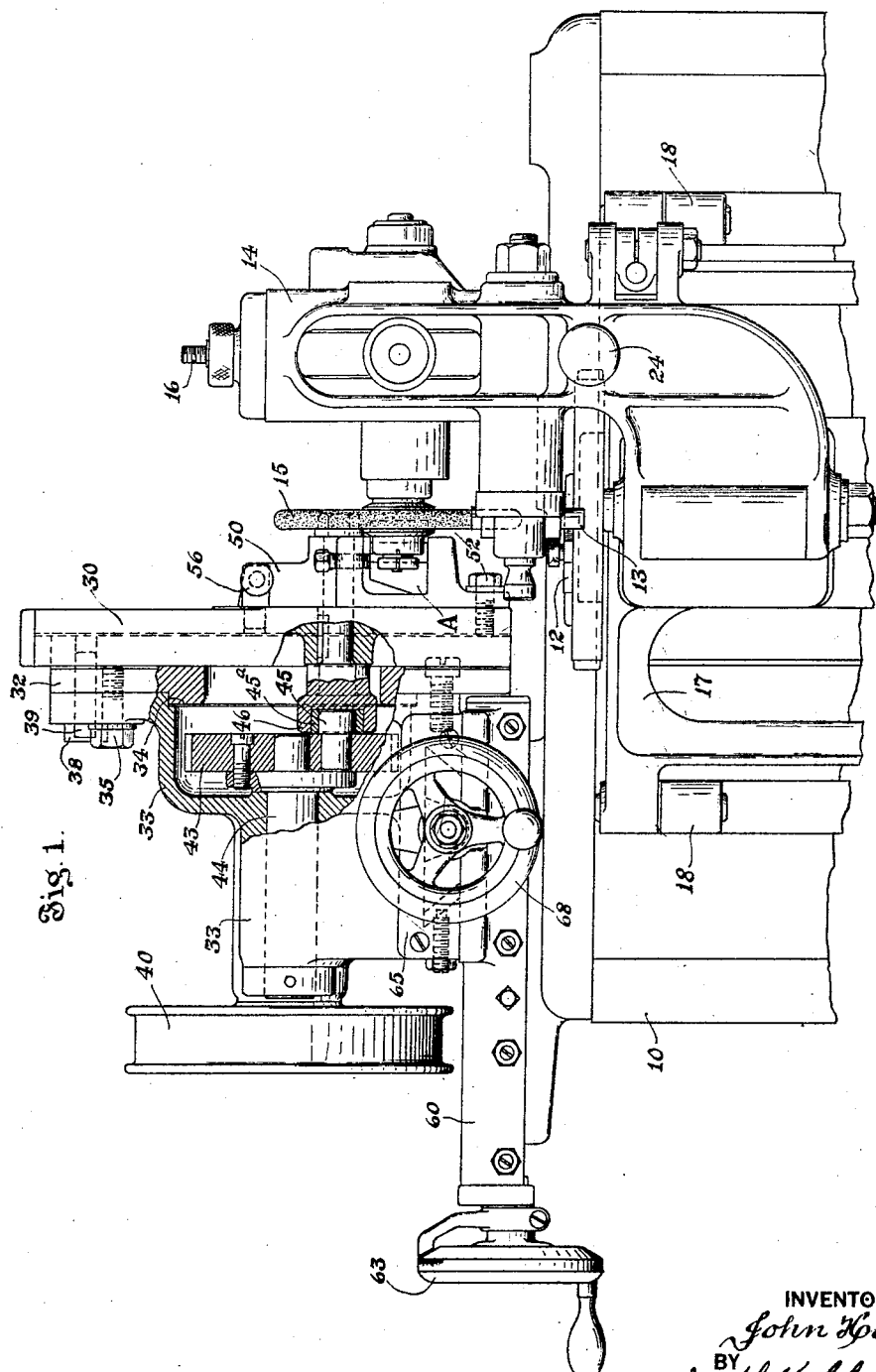

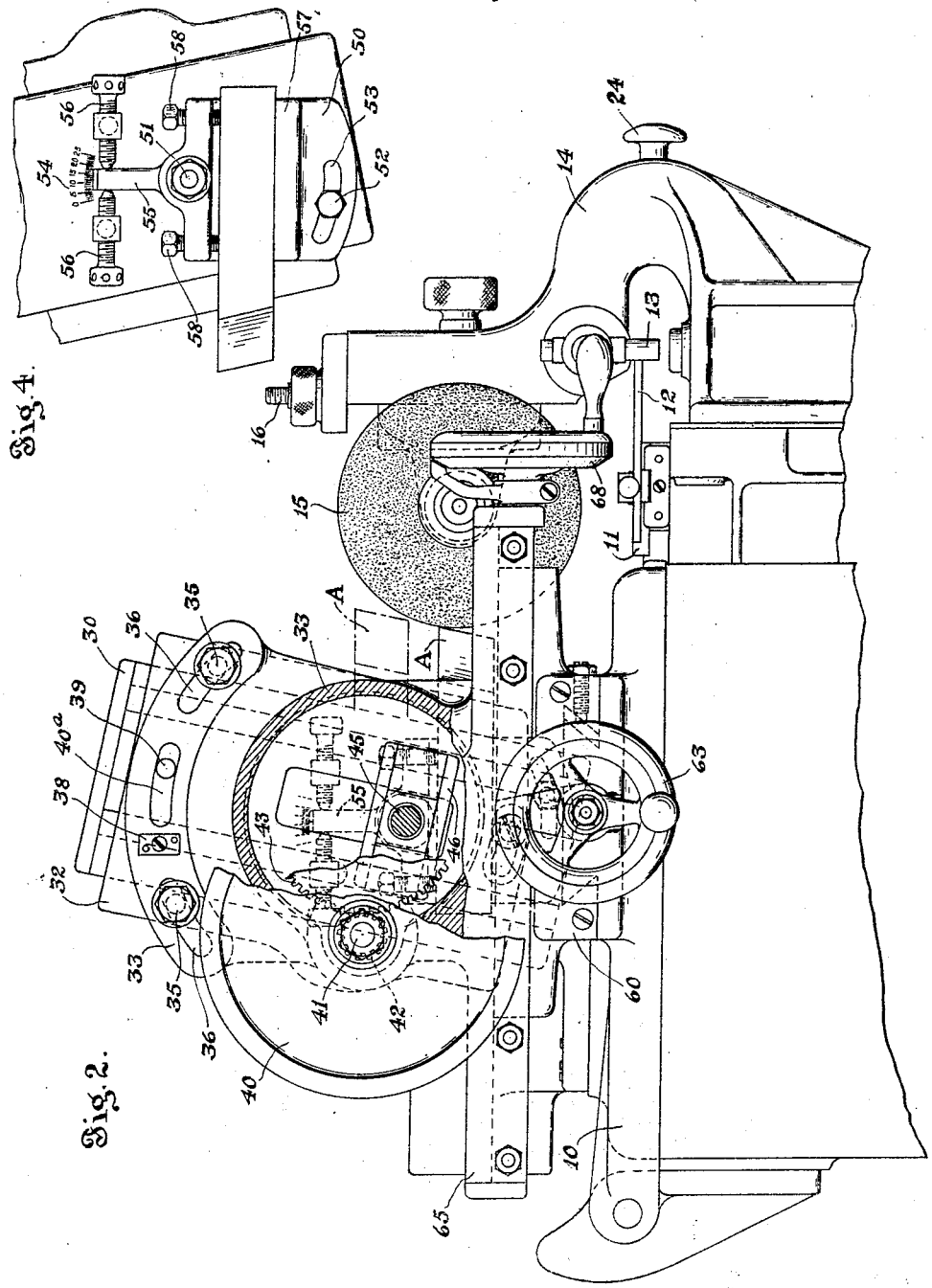

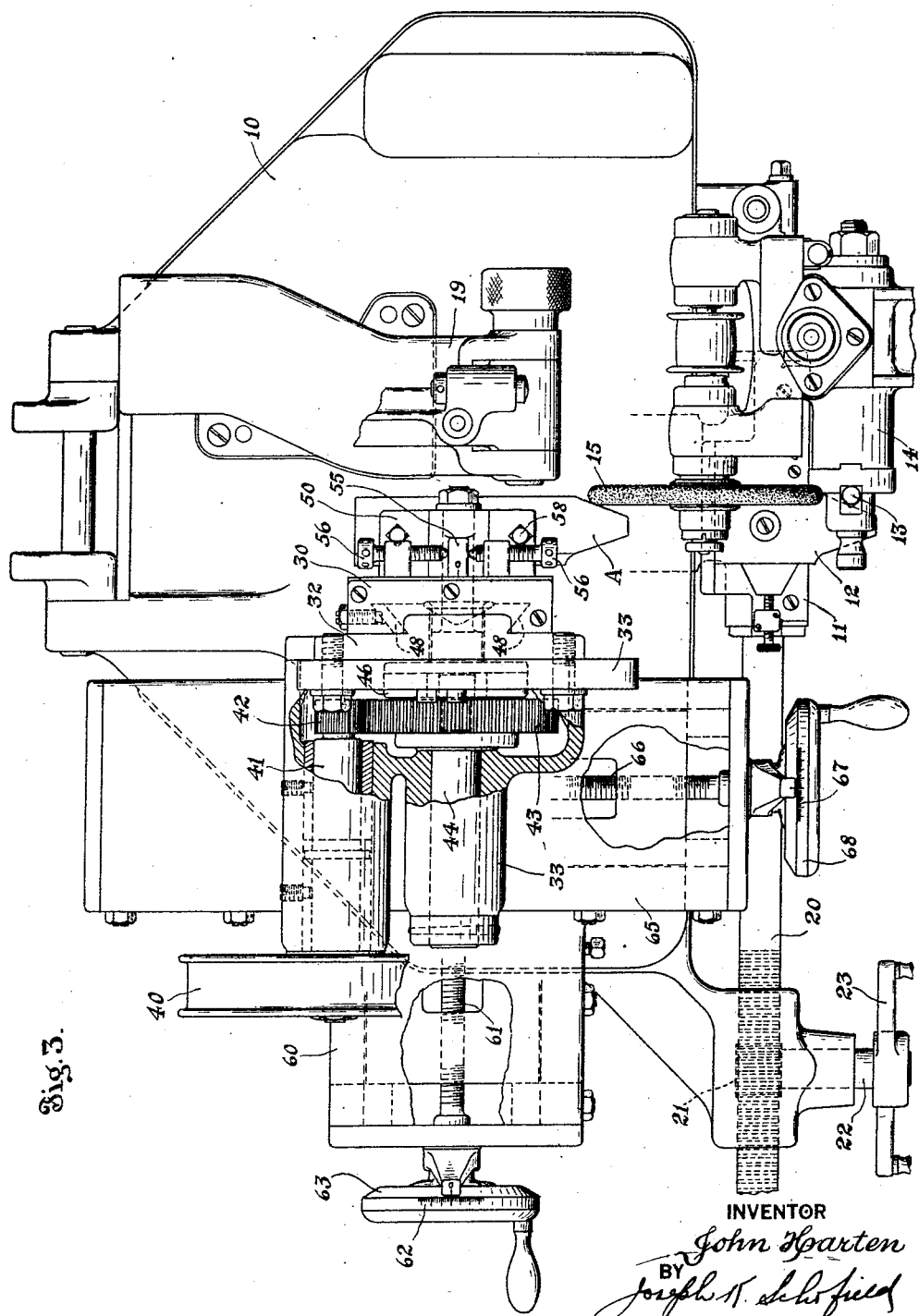

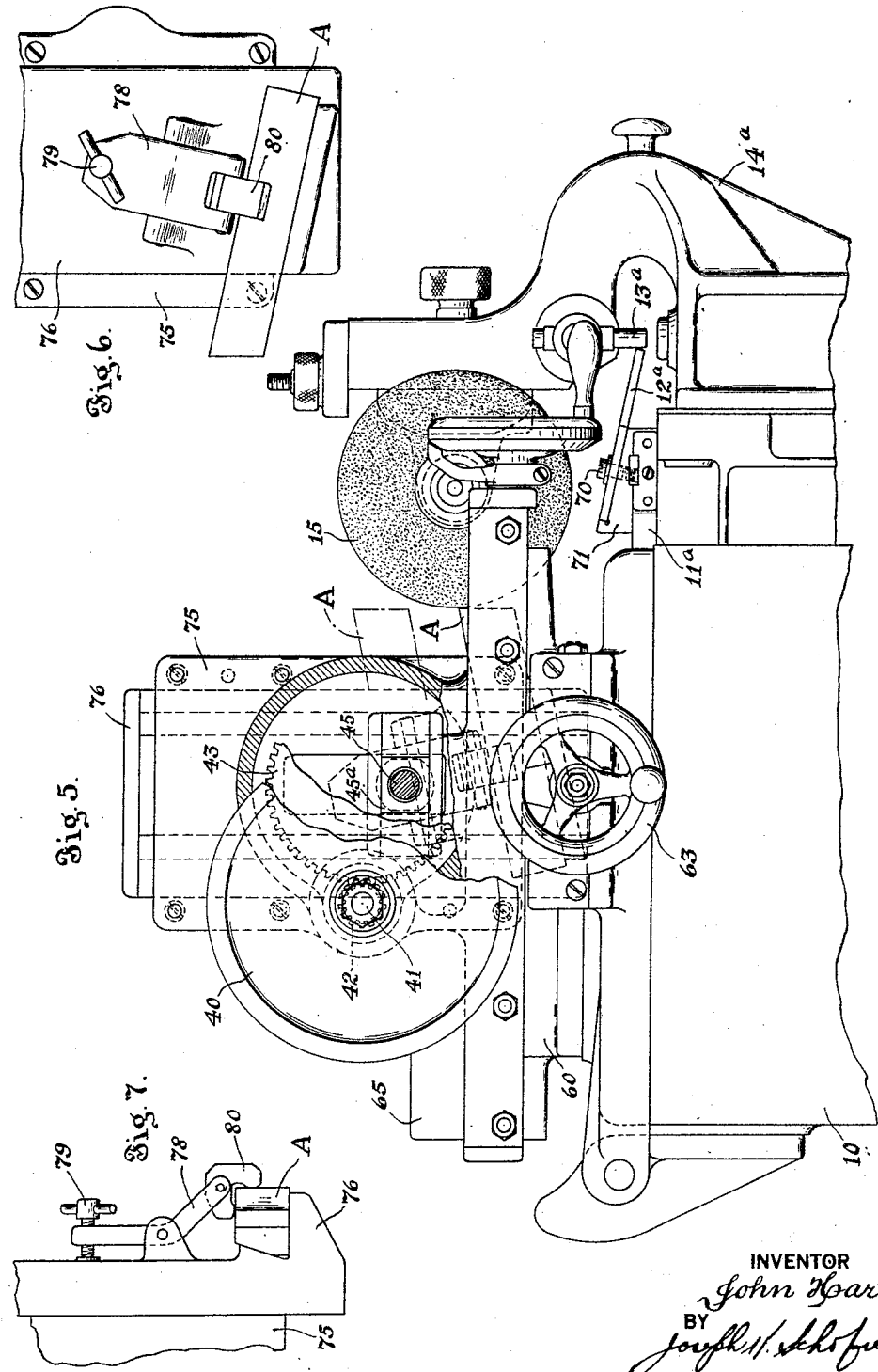

1,543,259

UNITED STATES PATENT OFFICE.

JOHN HARTEN, OF HARTFORD, CONNECTICUT, ASSIGNOR TO PRATT & WHITNEY COMPANY, OF NEW YORK, N. Y., A CORPORATION OF NEW JERSEY.

CONTOUR TOOL GRINDER.

Application filed April 10, 1922. Serial No. 551,240.

*To all whom it may concern:*

Be it known that I, JOHN HARTEN, a citizen of the United States, residing at Hartford, in the county of Hartford and State of Connecticut, have invented certain new and useful Improvements in Contour Tool Grinders, of which the following is a specification.

This invention relates to a tool grinding machine and in particular to a grinding machine adapted to accurately grind any predetermined contour on a slotter or planer tool.

An object of the invention is to provide a mechanism enabling a cutting tool to be formed of the planer or slotter type having a contour on its cutting surfaces of any predetermined form and formed also with a predetermined relief, the angle of which may be varied within limits as desired.

Another object of the invention is to provide a machine which will grind the entire relieved cutting surfaces of a tool for a slotting machine or planer so that the tool may be rapidly re-sharpened upon one of its flat surfaces without affecting the accuracy of the contour it is designed to cut.

One feature which enables me to accomplish the above objects is that I mount the tool to be ground in a slide and reciprocate it, preferably in an oblique plane, along the elements of its relieved surface, and, while it is being reciprocated, a grinding wheel is manually moved about its contour. The path of movement of the wheel about the outline of the tool is determined by an accurately formed former or templet corresponding to the contour to be ground on the tool.

Another feature which is advantageous is that by mounting the reciprocating slide upon an angularly adjustable mounting, its position may be varied so that any desired angle of relief may be obtained. If desired, however, the tool may be reciprocated vertically with the tool mounted obliquely in the slide. In each case, the tool is adapted to be clamped to the reciprocatory wheel in such a manner that its movement will be oblique relative to the slide.

Another object of the invention is to apply the novel features of the present invention to a portion of the construction disclosed in a patent granted to Hanson, February 1, 1921, No. 1,367,382. This patent discloses a mechanism adapted for grinding the contour of a milling or other rotating cutter and one of the principal objects of the present invention is to mount a planer or slotter tool on the patented tool grinding machine so that the pantograph mechanism for holding the wheel head as well as the wheel and former supports may be used without change.

With these and other objects in view, my invention consists in the features of construction and operation set forth in the following specification and illustrated in the accompanying drawings.

In the accompanying drawings annexed hereto and forming a part of this specification, I have shown my invention embodied in a machine for grinding a slotting tool adapted to cut an internal gear, but it will be understood that the invention can be otherwise embodied and that the drawings are not to be construed as defining or limiting the scope of the invention, the claims appended to this specification being relied upon for that purpose.

In the drawings:

Figure 1 is a front elevation of the mechanism forming the present invention, also showing a part of the patented machine to which it may be applied.

Fig. 2 is a side view of the same.

Fig. 3 is a plan view of the machine.

Fig. 4 shows an elevational view of a portion of the invention viewed from the opposite side from Fig. 2.

Fig. 5 shows a side view of a slightly modified form of the invention.

Fig. 6 shows an elevational view of a portion of the modification shown in Fig. 4 viewed from the opposite side from Fig. 5, and Fig. 7 is a side view of the parts shown in Fig. 6.

In the above mentioned drawings, I have shown two modifications of the invention which are now deemed preferable but it is to be understood that changes and modifications may be made within the scope of the appended claims without departing from the spirit of the invention.

Briefly, my invention in its broadest aspect comprises the following principal parts: first, a housing in which a reciprocating slide is mounted and on which the cutter to be ground may be suitably fastened; second, a mounting for this housing preferably permitting its position to be angularly varied; third, means to reciprocate the slide and cutter; fourth, a mounting for the grinding wheel permitting it to be moved about in any position with its axis maintained always in a fixed plane, the plane of the wheel therefore being maintained always in parallel positions; fifth, rotating means for the grinding wheel; and sixth, manually operated means for moving the wheel about while being held in contact with the work and while a former pin on the wheel head is in contact with a former fixed to the base and having a contour corresponding to that being ground.

Referring more in detail to the figures of the drawings, the machine disclosed in Figs. 1 to 4 comprises a preferred embodiment of the invention. Only a portion of the complete machine is shown in these figures as the remaining parts of the machine are, or may be, identical with corresponding parts shown in the patent to Hanson, 1,367,382, above mentioned.

The machine is provided with a base 10 only parts of which are shown, on which the tool reciprocating mechanism is mounted. This will presently be described. Also on the base is a fixture 11 on which the former 12 is mounted. The mounting for the former is shown clearly in Figs. 2 and 3 and is of the same type as that in the patent above referred to. This permits the former 12 to be suitably clamped in position to be engaged by a former pin. The former 12 is provided along one side with a contour of the exact form as the contour to be ground, and, in this modification shown in Figs. 1, 2 and 3, is mounted horizontally. A former pin 13 mounted vertically in a portion of the wheel mounting 14 is adapted to contact with the contour surface or edge of this former 12. The former 12 may be of any width dependent upon the type and contour of the tool to be ground and is of such length that its contour surface extends over the forward surface of the base 10 so that it may be in position to be engaged by the former pin. The former 12 is mounted in this modification so that its upper surface is in a horizontal plane and it engages the cylindrical surface on the vertical pin 13.

On this wheel head 14 is a rotatably mounted grinding wheel 15, the axis of which may be adjusted vertically by operation of the adjusting screw 16 shown. The wheel head 14 is mounted on a member 17 supported by a pantograph linkage, parts of which are shown at 18. This linkage is of the exact form disclosed in the above mentioned patent so that the wheel head 14 may be moved about in any position while the axis of the wheel 15 is maintained always in the same horizontal plane. Preferably, I also provide similar manual means for operating the head 14 toward either side, this being in the form of a rack 20 and pinion 21, the pinion 21 being mounted on a shaft 22 to which a handle 23 is fixed at its forward end. By rotating this handle 23 in opposite directions while pressing the wheel head 14 rearwardly by means of the knob 24 so that the former pin 13 is held in contact with the former 12, the wheel 15 may be guided in any direction dependent upon the particular contour of the former 12 being used. During this manual traverse movement of the wheel the tool A is continually being reciprocated.

The wheel 15 must be of a width corresponding exactly to the diameter of the former pin 13 so that it may accurately duplicate the shape of the former 12 upon the tool being ground. For different shapes or contours to be ground having curves of different radii, different sizes of former pins 13 and grinding wheels 15 may be substituted. I also may use a wheel dressing mechanism, (not shown) which is preferably similar to that disclosed in the above mentioned patent, so that the effective contour of the wheel 15 on its grinding plane may be dressed to a radius identical with the radius of the former pin. This mechanism may be mounted on the supporting arm 19. As above stated, these parts are identical with those provided in the structure disclosed in the above mentioned patent so that a more specific description thereof is unnecessary.

The structure of the patented machine is adapted primarily for milling or other forms of rotatable cutters, and the present invention is adapted for reciprocatory tools so that a radical change in the means for supporting, controlling and operating the tool to be ground is required. Instead of mounting the tool A to be ground upon a rotating axis and indexing it as shown in the above mentioned patent, it is positioned by being rigidly clamped to a slide 30, this slide being mounted in an angularly adjustable housing 32 so that its direction of movement may be materially changed. With the housing 32 adjusted to an oblique angle, the tool A is reciprocated in a vertical plane, its direction of movement in this vertical plane being oblique.

The housing 32 is mounted in a head 33 mounted on the base 10 in a manner presently to be described and the housing 32 is adjustably fixed therein so that a cylindrical projection 34 on the housing engages a corresponding recess formed in the head 33.

Short headed screws 35 are provided threaded into the housing 32 and extending through arcuate slots 36 in the head 33. By these means, the housing 32 may be angularly adjusted about a horizontal axis and clamped securely in any desired angular position.

To determine the angular position to which the housing 32 is adjusted, I provide the following special means. On one of the vertical surfaces of the head 33, I secure a small plate 38 the side surfaces of which are precisely vertical. On the housing 32, I mount a horizontal pin 39 outstanding from the housing and extending through a slot 40ª in the head 33, see Figs. 1 and 2. This pin 39 is fixed to the housing at a predetermined distance from the axis about which the housing 32 is adjustable and the distance between a surface on the pin 39 and a surface on the plate 38 when the housing 32 is disposed vertically is determined. To obtain the angular adjustment of the housing 32 in any oblique position it is only necessary therefore to obtain the distance by micrometer, or block gages, between surfaces of the pin 39 and plate 38 from which, after allowance for the minimum distance between the two parts, the angle in degrees to which the housing 32 is adjusted may be determined from a table of trigonometric functions.

The mechanism for reciprocating the slide 30 within the housing 32 comprises a driving pulley 40 adapted to be driven by any suitable source of power and which is mounted on a driving shaft 41 on the opposite end of which is a small pinion 42. This pinion 42 is in engagement with a larger gear 43 mounted upon a shaft 44, the axis of which corresponds to the axis of adjustment of the housing 32 for the slide 30. Rotation of this gear 43 rotates an eccentric pin 45 mounted in its side face on which is a sliding member 45ª which engages a transverse slot 46 fixed on a projection outstanding from the reciprocating slide 30. Dovetailed guideways 48 in the housing 32 are provided for the slide 30 holding it always in operative position with relation to the housing 32. From the above construction, it will be seen that the slide 30 to which the tool A is fixed may be rapidly reciprocated through a definite predetermined distance at any oblique angle in a vertical plane that may be necessary to form the tool with the proper relief.

After angularly adjusting the housing 32 and slide 30 to their oblique positions as above explained, it is necessary to angularly adjust the clamping means 50 for the tool A so that the tool A will be supported horizontally as shown. For this purpose the clamping mechanism 50 is angularly adjustable on the slide 30 as indicated most clearly in Fig. 4. As shown in this figure the clamping mechanism 50 is adapted to oscillate about a central bolt 51 and to be clamped in angular adjusting position by another bolt 52 threaded into the slide 30 and passing through an arcuate slot 53 in the clamping member 50. Graduations 54 are provided on the slide 30 adjacent a zero line inscribed on an arm 55 outstanding from the clamping member 50. Oppositely disposed screws 56 on the slide 30 engaging the arm 55 permit the tool A to be accurately adjusted into any oblique position that may be desired. The clamping member 50 is provided with an outstanding projection 57 having a plane upper surface on which the tool A may be placed and secured thereto by means of clamping screws 58.

The slide 30 and housing 32 are preferably mounted on slides to position the tool A being operated on relative to the wheel 15. For this purpose a saddle 60 or intermediate slide is fixed to the base 10, the position of which may be adjusted in one direction by rotation of the screw 61 as shown. This varies the position of the saddle 60 toward the left or right, the amount of movement being indicated by graduations 62 on the wheel 63 fixed to the screw 61. A forward and rearward moving slide 65 is mounted on this intermediate slide or saddle 60, the forward or rearward position of which may be varied by rotation of the adjusting screw 66. The cutter reciprocating slide 30 and its housing 32 are mounted on this upper slide 65. To determine the amount of movement of this slide toward the front or rear, graduations 67 are provided on the wheel 68 fixed to this adjusting screw 66.

From the above described mechanism, it will be seen that the tool A may be adjusted and clamped in adjusted operative position so that its upper face will be in a horizontal plane and it may then be reciprocated in a predetermined oblique direction in a vertical plane. The lateral and forward position of the tool A may be adjusted by means of slides 60 and 65 which move at right angles to each other so that the forward surface of the tool A being ground will contact with the periphery of the grinding wheel 15 when this wheel is in contact with the former 12. With the tool A so adjusted the grinding wheel 15 is moved toward the left and right by the handle 23 and rack 20 and pinion 21 construction while the former pin 13 on the wheel head 14 is held manually against the contour surface or edge of the former 12. It will be seen, therefore, that the effective contour of the former 12 will be reproduced on the horizontal upper surface of the tool A and that so long as the tool is ground along planes parallel to this upper face the effective contour of the tool will not be varied. Also by means of reciprocating the tool A in an oblique direction the tool is suitably relieved, the angle of relief or clearance being governed by the angle to which the slide 30 and housing 32 are adjusted and to which the tool A is positioned on the slide 30.

In Figs. 5, 6 and 7, I disclose a slightly modified form of the invention in which the effective relieved contour of the tool is ground to a form precisely identical with the contour of the former. In this case, the former 12ª is mounted on the former support 11ª in a position obliquely to the former pin 13ª, the angle corresponding to the angle of relief that may be desired on the tool being ground. The former pin 13ª on the wheel head 14ª is mounted vertically in the same manner as previously described. The tool A also is clamped or secured in oblique position, its oblique angle corresponding to the angle of relief desired. The tool A in its slide is then reciprocated in a vertical direction in a vertical plane. It will be noted that the oblique positions of the former 12ª and the tool A in this modification are inclined in opposite directions, these angles being exactly identical to each other. To hold the former in its predetermined oblique position, it is placed on and clamped by means of a screw 70 to the upper inclined surface of a block 71 which in turn is disposed in the same position on the base as the holding means 11 for the former 12 shown in Figs. 1, 2 and 3.

The tool reciprocating head 75 in this modified form is not provided with an angularly adjustable housing but is provided with a slideway in which a slide 76 may be reciprocated by means identical with those described previously. The reciprocation of this slide 76 is always precisely vertical and the inclination of the tool A as shown in Figs. 5 and 6 is not adjustable. The mechanism for reciprocating this slide may be in every way similar to that described previously. Preferably the slide 76 is provided with an outstanding member 77 having a plane upper surface on which the tool A may be placed. Clamping means comprising a pivotally mounted lever 78 and clamping screw 79 are provided which may be tightened to force a member 80 firmly against the tool A.

The remaining mechanism utilized in this modified form of the invention and the method of operation is or may be precisely the same as that disclosed in the modification shown in Figs. 1, 2 and 3.

What I claim is:

1. A tool grinding machine comprising in combination, a base, means on the base to reciprocate the tool in an oblique plane, grinding means movably mounted on said base and adapted to contact with a surface of said tool, and a former and former pin respectively on said base and grinding means whereby said grinding means may be guided to grind a predetermined contour on said tool.

2. A tool grinding machine comprising in combination, a base, means on the base to reciprocate the tool in angularly adjustable oblique planes, and a former and former pin respectively on said base and grinding means whereby said grinding means may be guided to grind a predetermined contour on said tool.

3. A tool grinding machine comprising in combination, a base, means on the base to reciprocate the tool, means to vary the direction of reciprocation of said tool, means to vary the position of said tool relative to its direction of reciprocation, and a wheel adapted to be moved in any direction while its axis is maintained always in the same plane and adapted to grind a predetermined contour on said tool while it is being reciprocated.

4. A tool grinding machine comprising in combination, a base, means on the base to reciprocate the tool, means to vary the direction of reciprocation of said tool, means to vary the position of said tool relative to its direction of reciprocation, a grinding wheel movably mounted on said base while its axis is maintained always in the same plane, and a former and former pin one of which is mounted on said base and the other movable with the grinding wheel whereby said grinding wheel may be guided to grind a predetermined contour on said tool.

5. A tool grinding machine comprising in combination, a base, means on the base to reciprocate the tool, means to vary the direction of reciprocation of said tool, means to vary the position of said tool relative to its direction of reciprocation, grinding means on said base and movable relative to said tool in a horizontal plane, and a former and former pin respectviely on said base and grinding means whereby said grinding means may guided to grind a predetermined contour on said tool.

6. A tool grinding machine comprising in combination, a base, a housing thereon, a reciprocatory slide in said housing, means to attach a tool to said slide whereby it may be reciprocated with said slide, a former adapted to be clamped in fixed position on the base, a wheel head movably mounted relative to the reciprocatory slide having a grinding wheel thereon, a pin on said head adapted to contact with the former on the base, and means permitting manual movement of said head with said wheel maintained in parallel planes and with the former pin in contact with the former, whereby said wheel may contact with and grind a predetermined contour on said tool.

7. A tool grinding machine comprising in combination, a base, a housing thereon, a reciprocatory slide in said housing, means to attach a tool to said slide at an angle oblique to the direction of reciprocation of said slide whereby it may be reciprocated with said slide, a former adapted to be clamped in fixed position on the base, a wheel head movably mounted relative to the reciprocatory slide having a grinding wheel thereon, a pin on said head adapted to contact with the former on the base, and means permitting manual movement of said head with said wheel maintained in parallel planes and with the former pin in contact with the former, whereby said wheel may contact with and grind a predetermined contour upon an oblique surface of said tool.

8. A tool grinding machine comprising in combination, a base, a housing thereon, a reciprocatory slide in said housing, means to attach a tool to said slide in a manner to be angularly adjustable whereby it may be reciprocated with said slide, a former adapted to be clamped in fixed position on the base, a wheel head movably mounted relative to the reciprocatory slide having a grinding wheel thereon, a pin on said head adapted to contact with the former on the base, and means permitting manual movement of said head with said wheel maintained in parallel planes and with the former pin in contact with the former, whereby said wheel may contact with and grind a predetermined contour upon an oblique surface of said tool the angle of which surface relative to the contour surface being adjustable.

9. A tool grinding machine comprising in combination, a base, an angularly adjustable housing thereon, a reciprocatory slide in the housing, means to attach a tool to said slide whereby it may be reciprocated with said slide disposed at different oblique angles, a former adapted to be clamped in fixed position on the base, a wheel head movably mounted relative to the reciprocatory slide having a grinding wheel thereon, a pin on said head adapted to contact with the former on the base, and means permitting manual movement of said head with said wheel maintained in parallel planes and with the former pin in contact with the former whereby said wheel may contact with and grind a predetermined contour on said tool.

10. A tool grinding machine comprising in combination, a base, a housing thereon, a reciprocatory slide in the housing, means to attach a tool to said slide whereby it may be reciprocated with said slide, a former adapted to be clamped in fixed position on the base with its contour surface disposed parallel to the cutting surface of the tool, a wheel head movably mounted relative to the reciprocatory slide having a grinding wheel thereon, a pin on said head adapted to contact with the former on the base, and means permitting manual movement of said head with said wheel maintained in parallel planes and with the former pin in contact with the former whereby said wheel may contact with and grind a predetermined contour on said tool.

11. A tool grinding machine comprising in combination, a base, an angularly adjustable housing thereon, a reciprocatory slide in the housing, means to attach a tool to said slide whereby it may be reciprocated with said slide disposed at different oblique angles, a former adapted to be clamped in fixed position on the base with its contour surface disposed parallel to the cutting surface of the tool, a wheel head movably mounted relative to the reciprocatory slide having a grinding wheel thereon, a pin on said head adapted to contact with the former on the base, and means permitting manual movement of said head with said wheel maintained in parallel planes and with the former pin in contact with the former whereby said wheel may contact with and grind a predetermined contour on said tool.

12. A tool grinding machine comprising in combination, a base, an angularly adjustable housing thereon, a reciprocatory slide in the housing, means to attach a tool to said slide so that it may be angularly adjustable thereto whereby it may be obliquely reciprocated with said slide disposed at different oblique angles, a former adapted to be clamped in fixed position on the base with its contour surface disposed parallel to the cutting surface of the tool, a wheel head movably mounted relative to the reciprocatory slide having a grinding wheel thereon, a pin on said head adapted to contact with the former on the base, and means permitting manual movement of said head with said wheel maintained in parallel planes and with the former pin in contact with the former whereby said wheel may contact with and grind a predetermined contour on said tool.

13. A tool grinding machine comprising in combination, a base, an angularly adjustable housing thereon, a reciprocatory slide in the housing, means to adjustably attach a tool to said slide whereby it may be reciprocated obliquely with said slide while positioned obliquely thereon, a former adapted to be clamped in fixed position on the base, a wheel head movably mounted relative to the reciprocatory slide having a grinding wheel thereon, a pin on said head adapted to contact with the former on the base, and means permitting manual movement of said head with said wheel maintained in parallel planes and with the former pin in contact with the former whereby said wheel may contact with and grind a predetermined contour on said tool.

14. A tool grinding machine comprising in combination, a base, an angularly adjustable housing thereon, a reciprocatory slide in the housing, means to adjustably attach a tool to said slide whereby it may be reciprocated obliquely with said slide while positioned obliquely thereon, means to indicate the angles to which said slide and tool are respectively adjusted, a former adapted to be clamped in fixed position on the base with its contour surface disposed parallel to the cutting surface of the tool, a wheel head movably mounted relative to the reciprocatory slide having a grinding wheel thereon, a pin on said head adapted to contact with the former on the base, and means permitting manual movement of said head with said wheel maintained in parallel planes and with the former pin in contact with the former whereby said wheel may contact with and grind a predetermined contour on said tool.

15. A tool grinding machine comprising in combination, a base, a housing thereon, a reciprocatory slide in said housing, means to adjustably attach a tool to said slide whereby it may be reciprocated at different oblique angles in a predetermined plane, means to vary the position of the housing on said base, a former adapted to be clamped in fixed position on the base, a wheel head movably mounted relative to the reciprocatory slide having a grinding wheel thereon, a pin on said head adapted to contact with the former on the base, and means permitting manual movement of said head with said wheel maintained in parallel planes and with the former pin in contact with the former, whereby said wheel may contact with and grind a predetermined contour on said tool.

16. A tool grinding machine comprising in combination, a base, a housing thereon, a reciprocatory slide in said housing, means to adjustably attach a tool to said slide whereby it may be reciprocated at different oblique angles in a predetermined plane, means to vary the position of the housing on said base in directions at right angles to each other, a former adapted to be clamped in fixed position on the base, a wheel head movably mounted relative to the reciprocatory slide having a grinding wheel thereon, a pin on said head adapted to contact with the former on the base, and means permitting manual movement of said head with said wheel maintained in parallel planes and with the former pin in contact with the former, whereby said wheel may contact with and grind a predetermined contour on said tool.

In testimony whereof, I hereto affix my signature.

JOHN HARTEN.